United States Patent [19]

Shimizu

[11] Patent Number: 5,293,580
[45] Date of Patent: Mar. 8, 1994

[54] MULTI-DIMENSIONAL IMAGE SIGNAL COMPRESSION AND DECOMPRESSION SYSTEM THAT GUARANTEES HIGH EFFICIENCY EVEN WHEN DIFFERENT COMPRESSION AND DECOMPRESSION SYSTEMS ARE USED ON TRANSMITTING SIDE AND RECEIVING SIDE FOR IMAGE INFORMATION SIGNALS

[75] Inventor: Kyoichi Shimizu, Yokohama, Japan

[73] Assignee: Victor Company of Japan, Ltd., Yokohama, Japan

[21] Appl. No.: 831,108

[22] Filed: Feb. 4, 1992

[30] Foreign Application Priority Data

Feb. 5, 1991 [JP] Japan .................. 3-035479

[51] Int. Cl.$^5$ ............................................. G06K 9/36
[52] U.S. Cl. ...................................... 382/56; 382/22; 348/391
[58] Field of Search ............... 382/56, 22, 27, 53, 382/26; 358/133, 138; 7/426; H04N 7/12

[56] References Cited

U.S. PATENT DOCUMENTS

| | | | |
|---|---|---|---|
| 4,107,648 | 8/1978 | Frank | 382/26 |
| 4,455,571 | 6/1984 | Shimizu et al. | 358/138 |
| 4,499,598 | 2/1985 | Chittineni | 382/22 |
| 4,868,764 | 9/1989 | Richards | 382/56 |
| 4,926,266 | 5/1990 | Kurosawa | 382/56 |
| 4,932,066 | 6/1990 | Nakayama et al. | 382/56 |
| 4,939,583 | 7/1990 | Tsuboi et al. | 382/56 |
| 5,142,592 | 8/1992 | Moler | 382/22 |

FOREIGN PATENT DOCUMENTS 63-55276 11/1988 Japan .

Primary Examiner—Joseph Mancuso
Attorney, Agent, or Firm—Jacobson, Price, Holman & Stern

[57] ABSTRACT

A multi-dimensional image compression & decompression method that can compress and decompress image information at high efficiency in the case of image that have different numbers of picture elements on the sending and receiving sides and for image information such as three-dimensional brightness information and the like that includes two-dimensional brightness information and a time axis, extracts local maximum brightness points and local minimum brightness points and sudden change points makes them characteristic points of the image, and uses the local maximum brightness points and local minimum brightness points and sudden change points for the transfer, recording and regeneration of the image. In addition, an apparatus configured so as to include a resistor mesh is used when there is the regeneration of the image, so that the calculations for the decompression of multi-dimensional images are facilitated. By this, it is possible to easily realize high compression in accordance with the amount of information of the image, and irrespective of the physical conditions such as differences in the number of picture elements configuring between the original image that is to have compression of the image information performed, and the reproduced image that is obtained through decompression.

15 Claims, 7 Drawing Sheets

MULTI-DIMENSIONAL IMAGE SIGNAL COMPRESSION AND DECOMPRESSION SYSTEM THAT GUARANTEES HIGH EFFICIENCY EVEN WHEN DIFFERENT COMPRESSION AND DECOMPRESSION SYSTEMS ARE USED ON TRANSMITTING SIDE AND RECEIVING SIDE FOR IMAGE INFORMATION SIGNALS

BACKGROUND OF THE INVENTION

The present invention relates to a multi-dimensional image compression & decompression system, and in particular, to a multi-dimensional image compression & decompression system that performs high-efficiency image compression & decompression in a system where picture element correspondence or frame correspondence on a time axis are not guaranteed on a compression side and a decompression side and so that image transfer between apparatus of different types is possible.

Various systems have been proposed for the compression of image information. For example, when a means to divide signals levels equivalently with respect to each sample value of image signals that have been made into digital signals, and to linearly (equivalently) quantize values included in the respective ranges by replacement with a single representative value is used, it is generally necessary to change from 6 bits (64 gradations) to 8 bits (256 gradations) for natural images in cases where the difference between the representative value and the original value is not known. It is therefore necessary to handle much information with respect to each sample value if image signals are to have signals that have been digitalized by equivalent quantization as described above, are to be recorded as they are.

Coding signals using a smaller amount of information is sensitive to portions where there are few changes in the signal, and even if there is a certain degree of error in portions where there are large changes in the signals, it is possible to overcome this by the nature of human audio and visual perception being such that these are difficult to detect. Alternatively, the correlation on the time-space axis for information signals that are the object of recording can be used so that for example, after the image is disassembled into picture elements, the height of the adjacency correlation for the brightness value of each picture element is used and a small number of approximate values for the original image are transferred, the difference portion between picture elements or the difference portion between frames can be transferred, or the fact that the high-frequency component is small can be used to perform reduction of the frequency elements. These and other high-efficiency coding systems to reduce the amount of information per sample can be applied for the recording, transfer or transmission of digital data that has had the data amount compressed. In addition, another conventionally known technique involves restoring the image by performing data decompression after digital data that has had the amount of data compressed, has been received and reproduced.

In the conventional image information compression systems described above, emphasis is placed on the favorable performance of restoration of the disassembled image and so there are many cases where a condition for this is agreement between the number of picture elements between the original image and the restored image (decompressed image) and so in cases where compression and decompression operation is performed between images having different numbers of picture elements, it is necessary to separately perform interpolation and extrapolation for the picture elements after decompression has been performed. However, in conventional image information decompression methods, this does not mean that only the real, effective information is extracted and decompressed, but that the system is dependent to a certain extent upon the physical elements configuring the image.

The case where an image that has been taken by a TV camera apparatus for example, is to be used for a printing plate for an image is used here as one example where the picture element densities in two images having different numbers of picture elements are extremely different. In this case, the picture element density of an image obtained by a TV camera apparatus is high at about "500×500" per screen but the picture element density of an image in electronic printing is "several thousands × several thousands" per screen and since there is such a large difference when compared to that obtained by a TV camera, an alias is generated by the picture element magnification even if a compression and decompression system is not implemented at all for the image information of the corresponding picture elements as described above, and in cases where interpolation is performed without picture element magnification as described above, it is not possible to avoid deterioration of the image quality due to interpolation distortion so as to supplement the enlarged interpolation area with weighted mean values of known data. Conversely to as described above, when the picture element density of an original image is high at "several thousands x several thousands" per screen, the correlation between adjacent picture elements is extremely high and so in principle, it is possible to have compression of the high-quality image information but as has been described, a conventional image information compression system has the disadvantage that the compression ratio cannot be increased since it is a condition for the number of picture elements is in agreement between the original image and the decompressed (restored) image.

SUMMARY OF THE INVENTION

An object of the present invention is to provide a multi-dimensional image signal compression & decompression system that guarantees high efficiency even when different compression and decompression systems are used on transmitting side and receiving side for image information signals.

In order to attain the objective described above, in a multi-dimensional image signal compression & decompression system in which image information such as three-dimensional brightness information and the like that includes two-dimensional brightness information and a time axis in static images has a brightness maximum point and a brightness minimum point and a brightness sudden-change point made characteristic points of the image, and the positions and the brightness values of the characteristic points of the image are used in the transfer, recording and the restoration of the image, a multi-dimensional image signal compression & decompression system wherein each corner point of the image is used as a characteristic point, the detection of the characteristic points in the peripheral surface of the image uses the one-dimensional brightness information on an edge, the detection of the characteristic point on the peripheral surface of the image uses the two-dimensional brightness information on the previously describe image peripheral surface, and proximity calculation or calculation according to equation (1) below, $$Za = \Sigma(zi/ri)/\Sigma(1/ri) \quad (1)$$

where,

Za is the decompressed brightness value, zi is the brightness value of each characteristic point, ri is the distance and time (if including time dimension) element from each characteristic point to the restoration point, and i is a characteristic point number, is used when the image is decompressed.

Only a characteristic points of an image are extracted irrespective of the degree of the picture element density in an image that is the object of image information processing and the compressed image data of the image information is obtained. When there is decompression, image information such as three-dimensional brightness information and the like that includes two-dimensional brightness information and a time axis in static images has a brightness maximum point and a brightness minimum point and a brightness sudden-change point made characteristic points of the image, and the positions and the brightness values of the characteristic points of the image are used in the transfer, recording and the restoration of the image, so that it is possible to draw a new image to a surface having a different picture element density and without performing picture element restoration from image data in the manner described above. In addition, each corner point of the image is used as a characteristic point, the detection of the characteristic points in the peripheral surface of the image uses the one-dimensional brightness information on an edge, and the detection of the characteristic point on the peripheral surface of the image uses the two-dimensional brightness information on the previously describe image peripheral surface. Furthermore, when the image is decompressed, proximity calculation or the equation (1) above is used to easily perform compression/decompression of the multi-dimensional image.

The compression/decompression system relating to the present invention has the configuration and the function described above and so a system relating to the present invention has the effect of being able to easily realize high-efficiency compression corresponding to the information amount of an image, and without the influence of physical conditions such as the difference between the number of picture elements in the original image for which compression of the image information signals is to be performed, and the number of picture elements in the reproduced image obtained by decompression.

BRIEF DESCRIPTION OF THE DRAWINGS

In the appended drawings.

DETAILED DESCRIPTION OF THE PREFERRED EMBODIMENTS

The following is a detailed description of the preferred embodiments of the multi-dimensional image compression/decompression system relating of the present invention, with reference to the appended drawings.

If the brightness of a black & white still image is z, and the horizontal direction and vertical direction of the image are x and y respectively, then the image can be generally expressed by the following equation (2).

$$z = f(x,y) \quad (2)$$

For moving images, if the time axis is t, then it is possible to express the moving image by the following equation (3).

$$z = f(x,y,t) \quad (3)$$

Here, if the function f is a polynomial function, then the brightness z inside the image can be expressed by equation (4), and if the Fourier transform of f is G ($\mu$, $\nu$, $\tau$), then the brightness z inside the image can be generally expressed by equation (5).

$$z = A_1 x + A_2 x^2 + \ldots + A_n x^n + B_1 y + B_2 y^2 + \ldots + B_n y^n + \quad (4)$$

$$C_1 t + C_2 t^2 + \ldots + C_n t^n + D$$

$$z = \int \int \int_{-\infty}^{\infty} G(\mu,\nu,\tau) \exp[2\pi j(\mu x + \nu y + \tau t)] d\mu d\nu d\tau)$$

Now, transmitting an image reproducing a brightness function as described above and determined by the transmitting side, on the receiving side but in general digital image transmission, the brightness function is not handled analytically, but is transferred as all of the table values of a required table function. However, in general conventional compression transfer, high-efficiency coding is performed using an adjacency correlation for these table values themselves, in a means that performs the same function as the table values after orthogonal transform but conventionally, there have been few compression methods that can extract characteristic values directly from analysis processing relating to brightness functions.

However, if high-efficiency coding of table values is not performed and instead, the brightness function itself is expressed by an approximate function, implementing a method that performs compression of image information requires investigation into the visual characteristics of multi-dimensional brightness functions. Then, when the information that has meaning is extracted from the image by the human eye, the outlines of the image first have to be extracted but the extraction of the contours is obtained by tracing the sudden-change points and the extreme positive and negative points (hereinafter termed the "peak points") of the brightness. Accordingly, on the frequency axis, this means emphasizing the high-frequency region and so there must be importance placed on a system that prevents the reproduction of the high-frequency region even in realization by proximity function.

Figure 1:
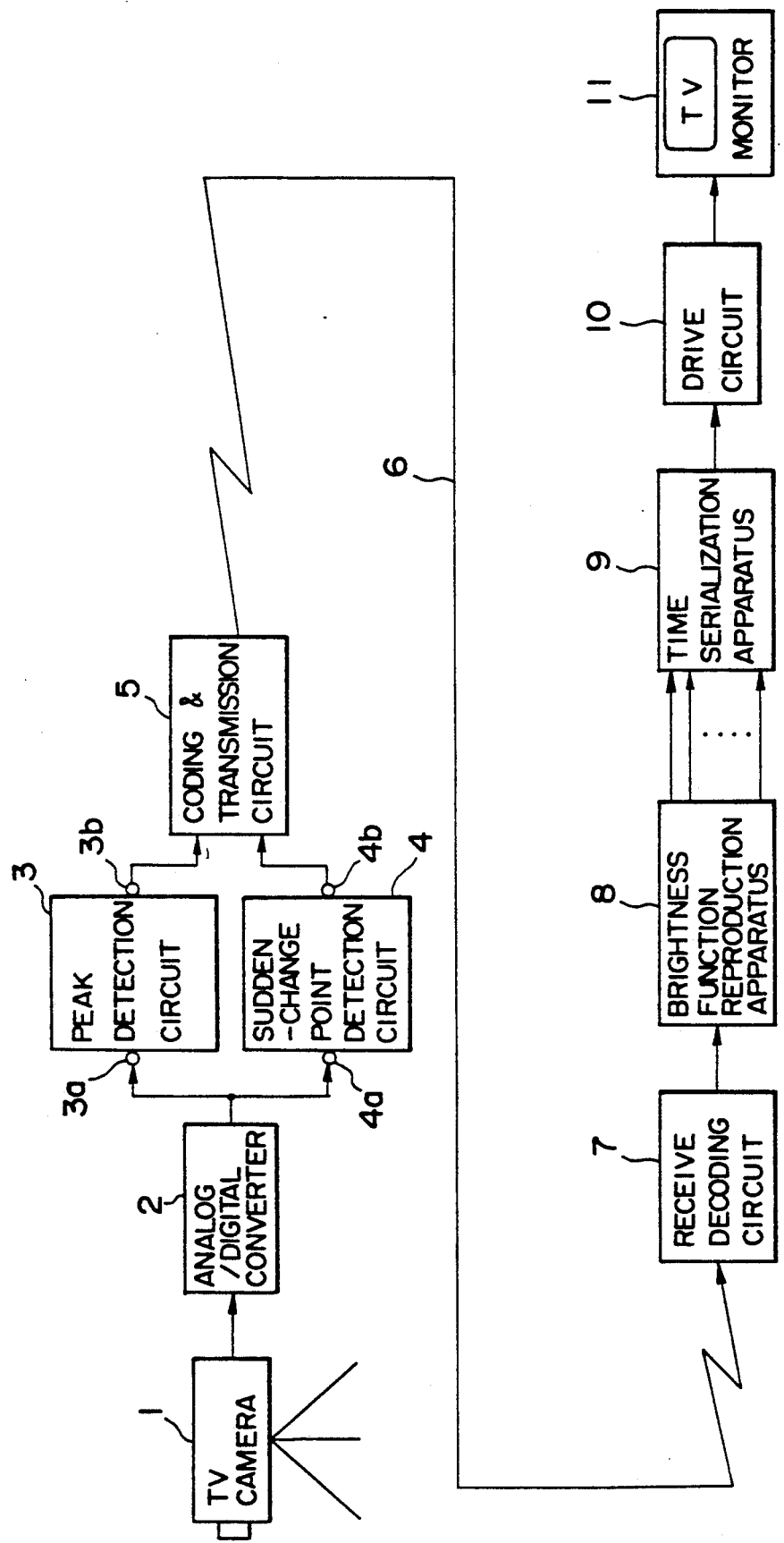
FIG. 1 is a block diagram showing a multi-dimensional image, signal compression/decompression system according to one embodiment of the present invention.
Figure 2:
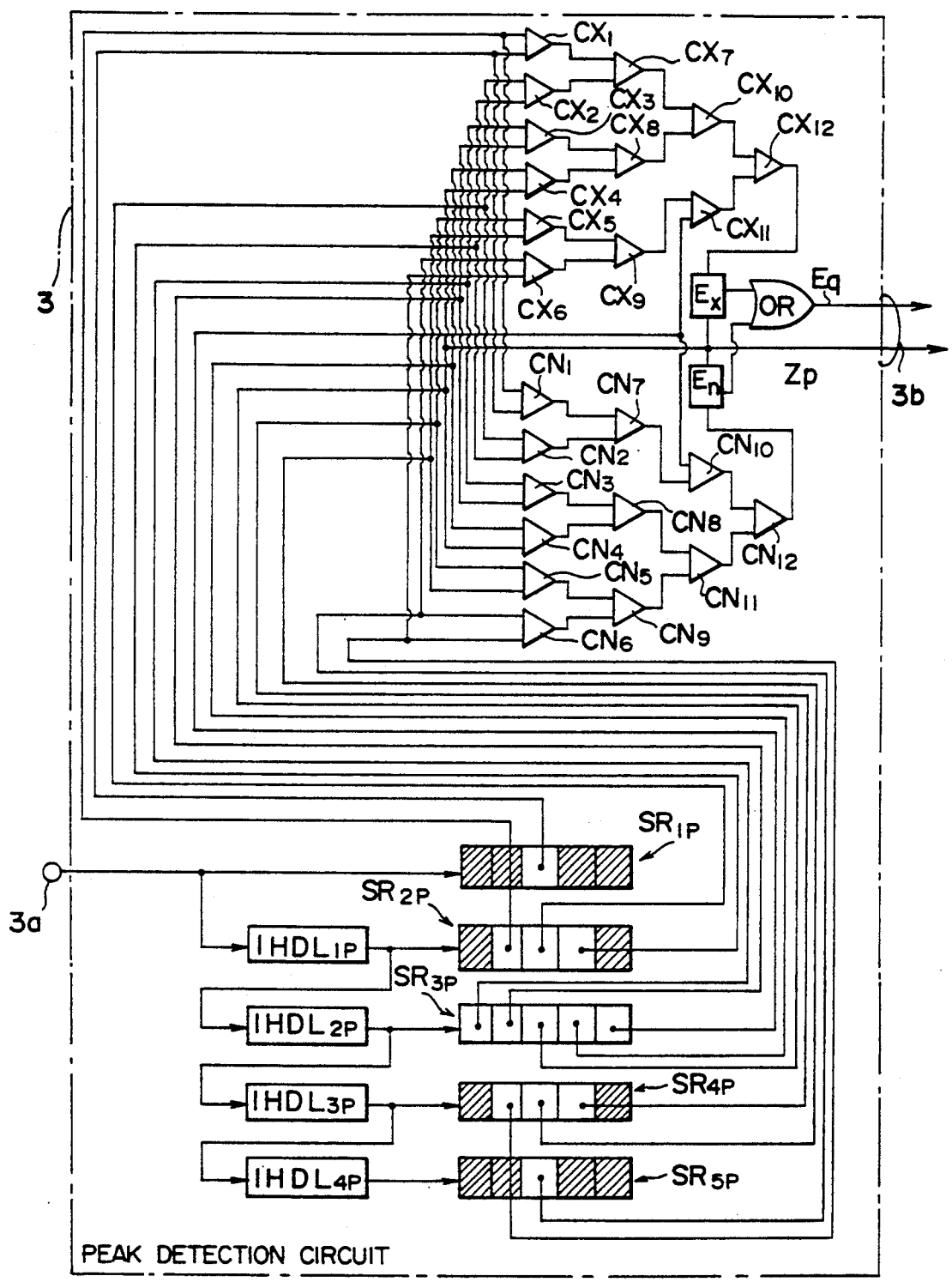
FIG. 2 is a block diagram showing an example of the configuration of a peak point detection circuit in the system shown in FIG. 1.
Figure 3:
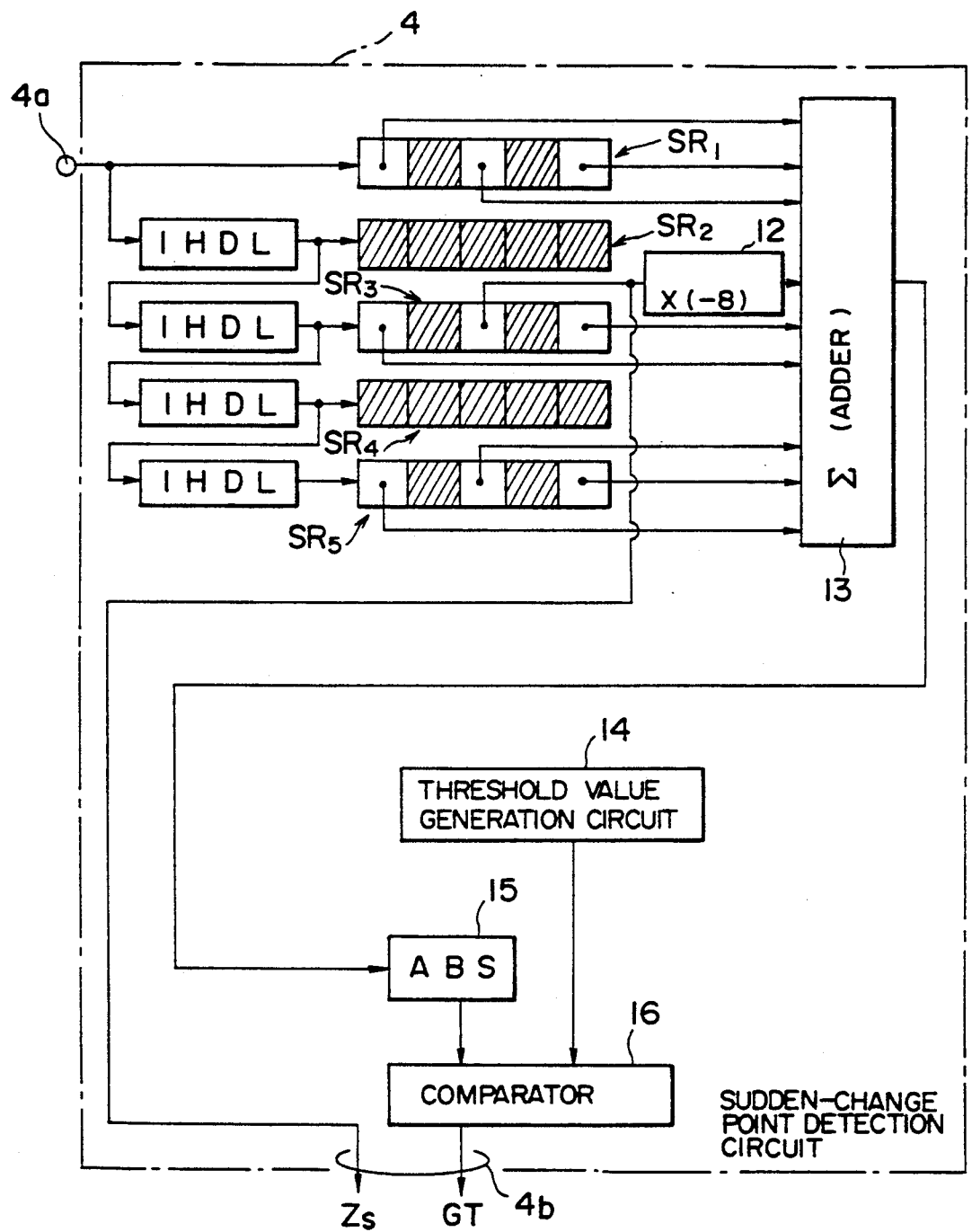
FIG. 3 is a block diagram showing an example of the configuration of a sudden-change detection circuit in the system shown in FIG. 1.

Therefore, in FIG. 1 that shows the multi-dimensional image compression & decompression system of the present invention, 1 is a camera apparatus (a TV camera) that generates the image signals, 2 is an analog/digital converter, 3 is a peak detection circuit (for which an example showing details of the configuration is shown in FIG. 2), 4 is a sudden-change point detection circuit (for which an example showing details of the configuration is shown in FIG. 3), 5 is a coding and transmission circuit, 6 is a transmission circuit (or a recording medium), 7 is a receive decoding circuit (or a reproduction decoding circuit), 8 is a brightness function reproduction apparatus, 9 is a time serialization apparatus, 10 is a drive circuit and 11 is a monitor image receiver.

The following is a description of the principle of image information compression and decompression in the multi-dimensional image compression & decompression system of the present invention. First, for still image, the following is performed for the characteristic points of the image as described above, that is, the local maximum points of brightness, local minimum points of brightness (peak points) and points of sudden change of brightness when the local brightness maximum points, local brightness minimum points (peak points) and brightness sudden-change points are extracted in the course of performing image information compression for a still image.

1) If the brightness za of the picture element a that is the object of investigation is larger than, or smaller than, all of the respective brightness $z_i$ of m number of picture elements of the periphery of the picture element a which is the object of investigation {i.e. $za > \max(z_i)$ or $za < \min(z_i)$}, then the picture element a which is the object of investigation is judged to be a peak point of positive or negative brightness.

2) When the absolute value of the secondary integral value of the brightness za of the picture element a and the brightness $z_i$ of n number of picture elements of the periphery of the picture element a which is the object of investigation, exceeds a threshold T {i.e. $|\Sigma z_i - n \cdot za| > T$}, it is judged that the picture element a is a sudden-change point of brightness.

Figure 4A:
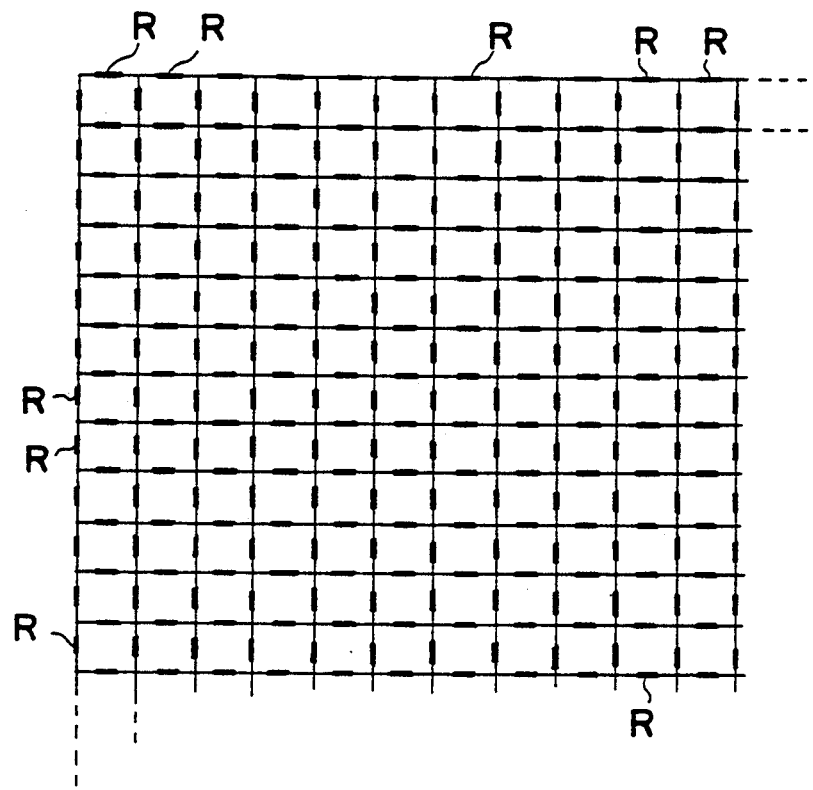
FIGS. 4A & 4B are plan views respectively various examples of the configuration of a resistance mesh used in a brightness signal reproduction apparatus in the system shown in FIG. 1.
Figure 4B:
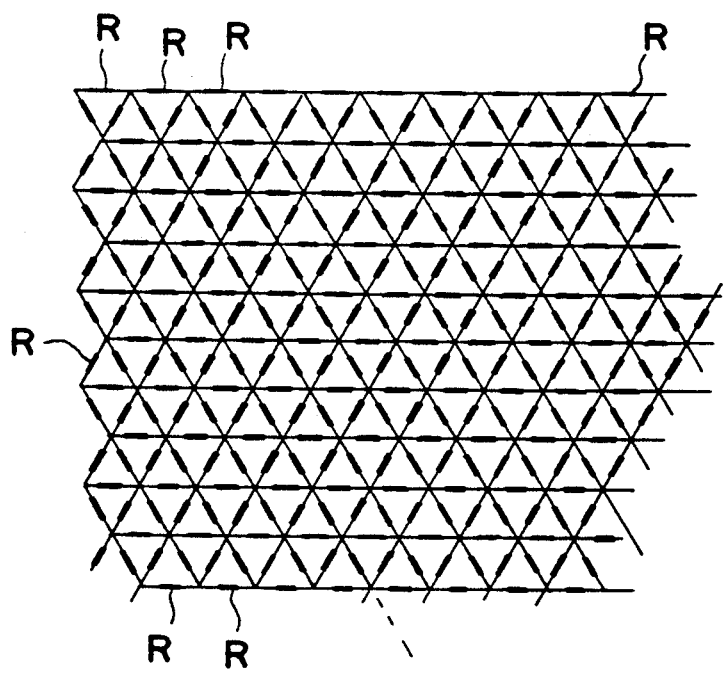

The following is a description of a specific example of the characteristic points of the image for the above described image information compression, that is, the extraction of the local maximum points of brightness, local minimum points of brightness (peak points) and points of sudden change of brightness when this is used as the judgment standard, and for the case of the example shown in FIG. 4 for the brightness distribution correlation inside a two-dimensional screen in an arbitrary still image.

Figure 7A:
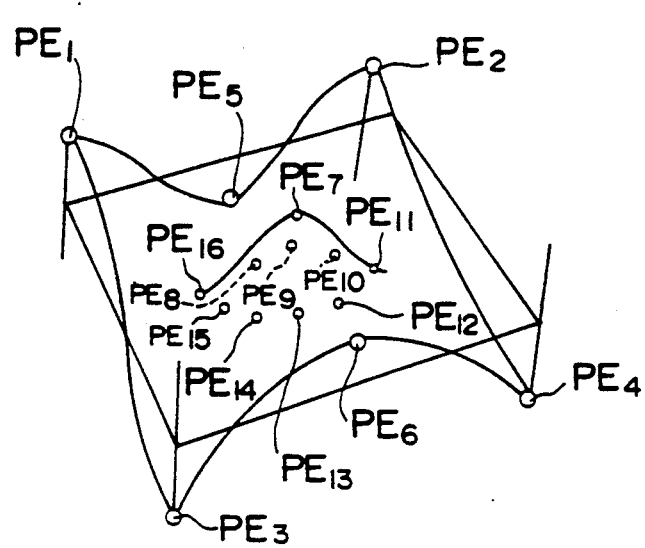
FIGS. 7A & 7B are views respectively showing examples of a brightness distribution function of an image, for describing the basic principle of the multi-dimensional image compression/decompression system relating to the present invention.

In an image which is the object of image information compression and for which the brightness distribution function for inside the two-dimensional screen is shown in FIG. 7A, firstly, for the brightness value of the picture elements PE1–PE4 at the four corners of the image, it is not possible to use the judgement standards of 1. and 2. above to extract the characteristic points with respect to the two-dimensional image information and so there is no performance of judgment operation for the characteristic points in the case of the brightness values of the picture elements PE1–PE4 at the four corners of the image, and thus the picture elements PE1–PE4 at the four corners of the image are handled as characteristic points from the beginning, and the judgment standards 1) and 2) that were previously described as the judgment standards for the extraction of the characteristic points with respect to two-dimensional image information also cannot be applied to judgment operation for the brightness values of the picture element arrays at the four corners of the image and so the judgment of the brightness values of the picture element arrays at the four corners of the image is performed by extracting the one-dimensional local maximum points of brightness, local minimum points of brightness (peak points) and points of sudden change of brightness for the picture element arrays at the four corners of the image, so that the peak point at the side that includes for example, the picture element PE1 and picture element PE2 of the image is judged as picture element PE5 but, the brightness along this side changes smoothly and so no sudden change point can be extracted.

In addition, the peak point on the side that includes the picture element PE3 and the picture element PE4 of the image is judged as the picture element PE6 but the brightness along this side changes smoothly and so as above, a sudden change point cannot be extracted. Furthermore, neither a peak point nor a sudden-change point can be extracted for the side that includes the picture element PE2 and the picture element PE4, and neither a peak point nor a sudden-change point can be extracted for the side that includes the picture element PE1 and the picture element PE3. Next, it is judged that the picture element PE7 is a peak point for the high-brightness portion of the rise in the center of the image, and that this is also a sudden-change point, and it is also judged that the picture elements PE8–PE16 contact both a plane and an incline and are therefore sudden-change points. In this manner, the brightness distribution function inside the two-dimensional screen is replaced, transferred and recorded as a total of 16 pieces of position and brightness information for the characteristic point in the case of the two-dimensional brightness function in an image which is the object of image information compression in the example shown in FIG. 7A, and in the multi-dimensional image compression & decompression system of the present invention, the image information is transferred (recorded) in the status where there is a high degree of compression.

As has been described above, replacing the two-dimensional brightness function in an image which is the object of image information compression with information for the position and brightness of a small number of characteristic points and transferring that image information that is transferred (recorded) in the status where it is compressed to a high degree and obtaining the reproduced image involves a decompression (regeneration) method whereby the characteristic points determine the brightness of corresponding points (although there need not be a correspondence in the sense of the original image and corresponding picture elements)

inside the decompressed image (reproduced screen) and wherein the power of influence to peripheral picture elements is lost in proportion to the distance from the characteristic points. Then, decompression (regeneration) by such a decompression (regeneration) method as has been described, is performed by linear interpolation between characteristic points in one dimension but is performed by regeneration of an image by complex extrapolation lines inside multi-dimensional spaces.

Figure 7B:
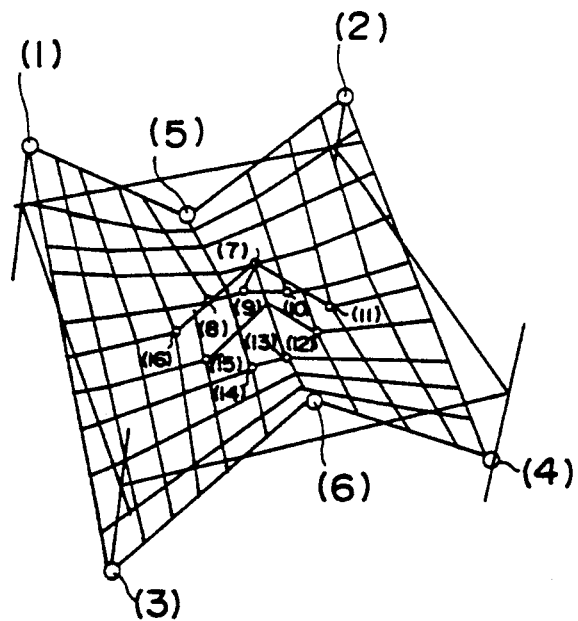

FIG. 7B shows an example of the brightness function that has been decompressed (regenerated) by two-dimensional interpolation on the basis of the total of 16 pieces of information for the positions and brightness of the characteristic points, when a brightness distribution function inside a two-dimensional screen is replaced in the manner described above, with a total of 16 pieces of information for the positions and brightness of the characteristic points by the image information compression operation described with reference to FIG. 7A, and is then transferred and recorded. Determining the interpolation values for brightness in an arbitrary picture element requires use of the distance from the characteristic point to said picture element and the brightness value of each characteristic point, and the calculation of the interpolation values in accordance with required conditions.

Then, the calculation operation for these interpolation values is executed from the sides of the image, and first involves determining the brightness values (1)-(4) of the four corners of the screen, and then linear interpolation of the characteristic points for each of the side of the screen so that all of the brightness values of the sides of the screen, that is all of the brightness values along side (1)→(5), side (5)→(2), side (2)→(4), side (4)→(6), side (6)→(3) and side (3)→(1) are determined and at the same time, all of the picture elements for which the brightness values are determined are handled as characteristic points and are used as elements when the brightness values on the inside portion of the screen are determined, and then the brightness values of the characteristic points (7)-(16) are determined and the determined brightness values of these characteristic points (7)-(16) are also used as elements when the brightness values on the inside portion of the screen are determined.

Now, when a specific picture element a inside the decompressed screen is considered, when the distance from that specific picture element a to a picture element of each characteristic point is ri, the brightness of a picture element of each characteristic point is zi, and $\alpha$ is a proportional constant, then the relationship between the brightness value zk of a single characteristic point k of the characteristic points and the brightness value za of the picture element a can be expressed by the interpolation equation of equation (6).

$$ZA = zk + \alpha k \cdot rk \quad (6)$$

The second term, $\alpha k \cdot rk$, on the right side of equation (6) expresses the discrepancy of the brightness value between the brightness value of the picture element a and the brightness value zk of the characteristic point k, and the value for this $\alpha k \cdot rk$ is proportional to the distance r. This $\alpha k \cdot rk$ for the discrepancy of the brightness value between the brightness value of the picture element a and the brightness value zk of the characteristic point k has both positive and negative values and this is reflected in the proportional constant $\alpha$ but the sum of all a for the entire interpolation space is zero. Therefore, when the $\alpha$ term is removed from equation (6) by the addition of the condition $$\Sigma \alpha k = 0 \quad (7)$$

the following equation (1) is obtained when the general interpolation equation for he rightness value za of the picture element a is determined.

$$za = \Sigma(zi/ri)/\Sigma(1/ri) \quad (1)$$

Here, if the brightness value zi of all of the characteristic points including the picture elements on the side of the screen and which were obtained by one-dimensional interpolation as has been described, and the distance r from the picture element which is the object of interpolation are known, then there is the potential for this equation (1) to be used to determine the brightness value of all non-interpolated picture elements (that need not have a picture element correspondence with the original image) on the inside of the screen.

The calculation that has to be performed when there is this compression and decompression operation involves storing the data for the brightness values of the image which is the object of compression and decompression in a frame memory, successively reading to a computer the data of the brightness values of the image and which are stored in the frame memory, and then performing the calculation by software but the with the calculation performance provided to current workstations, there is a problem in that it is not possible to complete the calculation within a calculation time that can be regarded as practical, and this is even more of a problem in the case of the calculation time when there is decompression operation.

Now, if the number of characteristic points is for example, 5,000, and if it is necessary to have 10,000 division operations for the brightness interpolation calculation for each picture element, then when the performance of a calculation for the decompression time when a still image that has approximately 500×500 picture elements is the object, is considered, the number of interpolation picture elements in this case is about (500×500)−5000=245,000 and so the total number of calculations becomes 245,000×10,000= 2,450,000,000.

Figure 5:
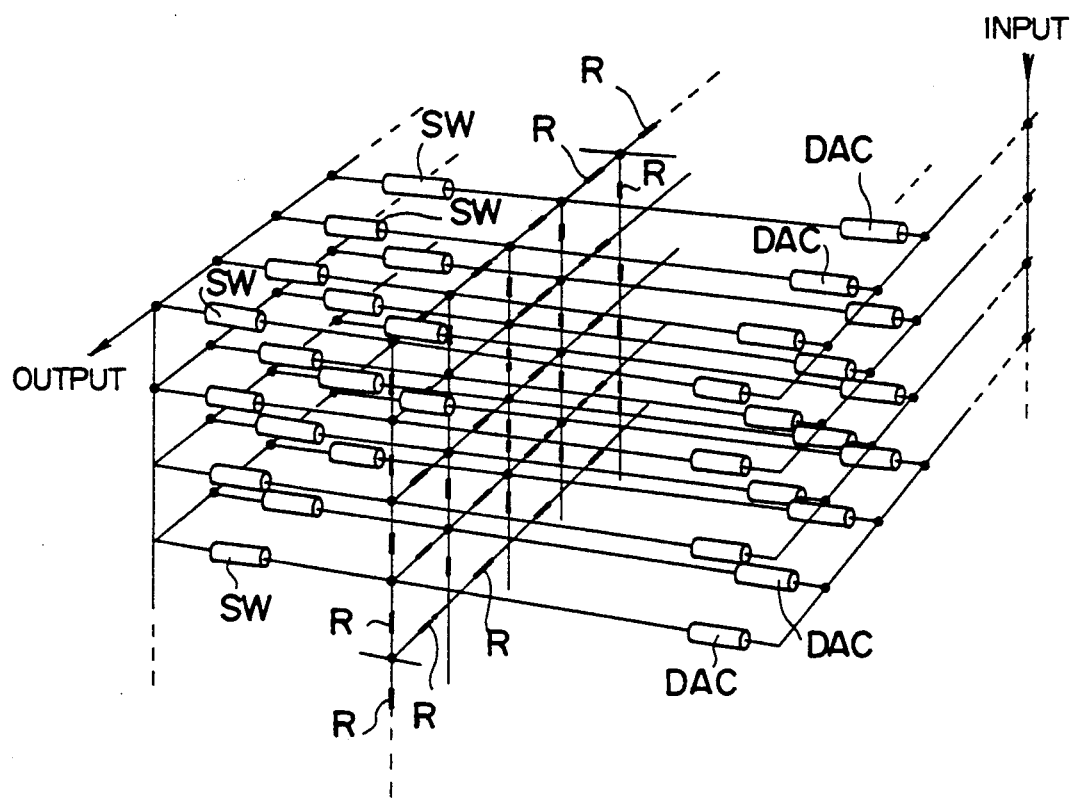
FIG. 5 is a block diagram showing an example of a configuration of a time serialization apparatus and a brightness signal reproduction apparatus in the system shown in FIG. 1.
Figure 6:
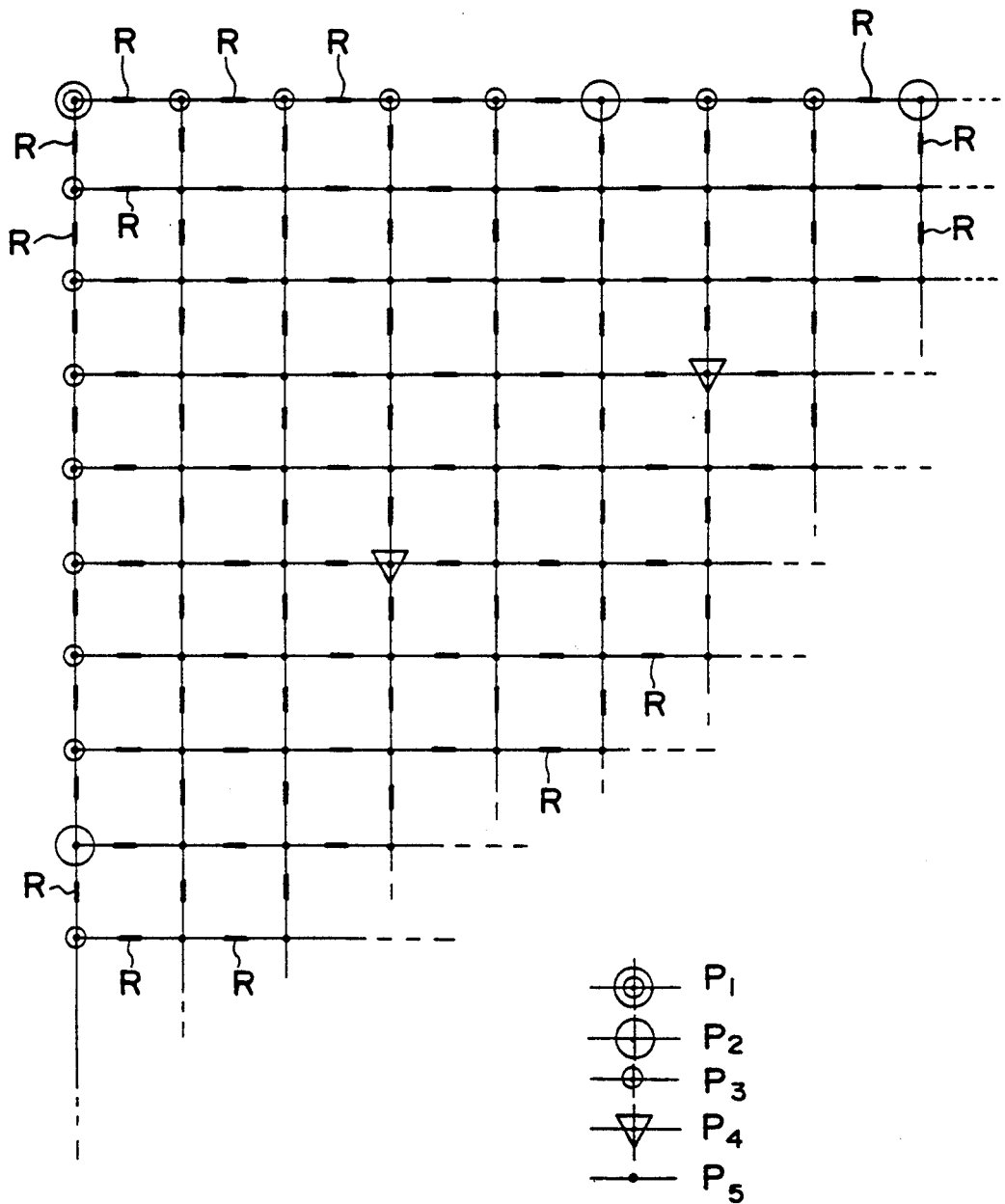
FIG. 6 is a plan view showing a resistance mesh and for describing the operation of the brightness function reproduction apparatus in the system shown in FIG. 1.

Therefore, in order to perform 2.4 billion calculations within a time of about 1 second, it is necessary to use a computer that has a calculation performance of 2.4Gflops but it is economically difficult for this to be realized at the present time. When the image that is the object is a moving image, it is necessary to have a calculation speed approximately 30 times as great when compared to the case for a still image and so realizing this is that much more difficult when compared to the case of still images. Therefore, with the multi-dimensional image compression & decompression system of the present invention, the calculation that is performed in accordance with the equation $$Za = \Sigma(zi/ri)/\Sigma(1/ri) \quad (1)$$

where,
Za is the decompressed brightness value,
zi is the brightness value of each characteristic point,
ri is the distance and time (if including time dimension) element from each characteristic point to the restoration point, and i si a characteristic point number, which is the decompression equation shown above as equation (1) and which is applied when there is image decompression, is possible for the calculation to be performed in a short time by a brightness function reproduction apparatus configured so as to be provided with a plural number of voltage detectors, a plural number of power sources and resistance meshes to be described later with respect to FIGS. 4 through 6, and performing a proximity calculation. More specifically, in the case where the decompression interpolation equation shown by (1) is replaced with a physical object, a circuit arrange such as that shown in FIG. 5 and having a configuration whereby it is possible to lead a voltage to the connection points of arbitrary resistors in a resistor mesh have a status such as that shown in FIG. 6 where a voltage is supplied from a plural number of power sources on a resistor mesh such as that shown in FIG. 4 enables proximity and can solve the problems described above.

In FIGS. 4A, 4B through FIG. 6, the portions shown by the short thick lines are resistors R, R, . . . and required voltages are respectively applied from respectively different power sources and with respect to the connection points of each resistor R, R, . . . shown in FIG. 5. In FIG. 5, a required voltage is supplied by a digital/analog R, R, . . . and switches SW separately and respectively connected to the connection points of each resistor R, R, . . . in the resistor mesh change to the on status one at a time in a required order so that the voltage at the connection points of each resistor R, R, . . . in this resistor mesh is output and taken in a series on the time axis, and the voltage value that is supplied via the digital/analog converter DAC and to the connection points of each resistor R, R, . . . in the resistor mesh is a voltage value corresponding to the information of the brightness of the characteristic point.

For each connection point of the respective resistors corresponding to the position of each characteristic point in the resistor mesh (resistor circuit network), a brightness value za of the picture element a that is separated from the characteristic point by the distance ri (approximated by the resistance value on the resistor mesh) in the status where a voltage corresponding to the information of brightness of the respective characteristic points is simultaneously supplied, can obtain a calculation value approximating the calculation value by equation (1) by detecting the voltage value that appears at the connection point of the resistor corresponding to the position of the picture element a in the resistor mesh.

This resistor mesh (resistor circuit network) uses a physical phenomena and is a proximity calculation apparatus that performs an approximate calculation in accordance with equation (1) but the calculation speed of proximity calculations performed using this resistor mesh (resistor circuit network) is determined by the speed of transfer of electrons inside the resistor mesh (resistor circuit network) and so this is generally in the order of from several picoseconds to several tens of picoseconds, and the proximity calculation described can be performed by completely parallel calculation and so it is possible for the interpolation proximity values for all decompression interpolation points in to be led in parallel and within the calculation time described above.

The above description is for the case where the voltage that is simultaneously supplied to each connection point of the respective resistors corresponding to the positions of each characteristic point in the resistor mesh (resistor circuit network) is a voltage that has voltage values which are respectively different and which correspond to the information of the brightness of the respective characteristic points. However, the voltage that is simultaneously supplied to each connection point of the respective resistors corresponding to the positions of each characteristic point in the resistor mesh (resistor circuit network) uses a voltage of a status (pulse width modulated wave) where a constant voltage is supplied inside a time for which the voltage value is determined beforehand so that the respective time values corresponding to the information of the brightness of the respective characteristic points is respectively different, an in this case, the integral value of the voltage value in this predetermine time uses the brightness value za of the picture element a.

In the multi-dimensional image compression & decompression system of FIG. 1, the camera apparatus (TV camera) 1 generates image signals in accordance with the television method of a required standard type and supplies them to an analog/digital converter 2. If the camera apparatus 1 is an image signal generation apparatus that can generate image information which is to be compressed and decompressed by the multi-dimensional image compression & decompression system of the present invention, then any configuration status can be used but the description below is for the case where the camera apparatus 1 has a configuration status that can generate black & white image signals of a moving image.

The image signals that are generated by the camera apparatus 1 are converted into digital signals by the analog/digital converter 2. This analog/digital converter 2 uses digital signals of a required number of bits (such as 8, for example) for each picture element in a status where each image signal is divided into a required number of picture elements (such as 512 picture elements in the horizontal direction of the image and 480 picture elements for the vertical direction of the image) for the horizontal and vertical directions of the image, and these are supplied to the input terminal 3a of the peak point detection circuit 3 (of which an example of the detailed configuration is shown in FIG. 2) and the sudden-change point detection circuit 4 (of which an example of the detailed configuration is shown in FIG. 3).

In the peak point detection circuit 3, detection of the peak point that is to be a characteristic point of the image that is the object of image information compression is performed and the information of the peak point in the detected image information is applied from the output terminal 3b to the coding and transmission circuit 5, and detection of the sudden-change point that is to be a characteristic point of the image that is the object of image information compression is performed and the information of the sudden-change point in the detected image information is applied from the output terminal 4b to the coding and transmission circuit 5.

In the coding and transmission circuit 5, there is conversion into a known code such as a Huffman code or the other code that is to transfer information at high efficiency, and this is sent to the receive coding circuit 7 via the transmission circuit 6. At the receive coding circuit 7, the coded signals that been transmitted to it and arrived are decoded and applied to the brightness function reproduction apparatus 8 (of which an example of the detailed configuration is shown in FIG. 5) When the portion of the transmission circuit 6 is a recording medium, the coding and transmission circuit 5 and the receive coding circuit 7 can respectively use recording and reproduction circuits.

At the brightness function reproduction apparatus 8, the information supplied for the characteristic points is used for regeneration of the two-dimensional brightness function. Then, the brightness value of each picture element that configures the regenerated two-dimensional brightness function is made time series signals of an analog signal status by the time serialization apparatus 9 and are supplied to the drive circuit 10. In the drive circuit 10, image signals of an image that is to be displayed on the monitor image receiver 11 is generated and these are applied to the monitor image receiver 11.

3a in FIG. 2 that shows an example of a detailed configuration of the peak point detection circuit 3 shown as block 3 of FIG. 1 is an input terminal, and to this input terminal 3a are input a digital brightness signal string of a picture element (where the digital brightness signals for each picture element and that configure the digital brightness signals string can express 256 gradations by one byte) as the time series obtained by scanning the image that is the object of image information compression and standardization coding by the generated image signals by an analog/digital converter 2.

The time serialized picture element digital brightness signals input to the input terminal 3a are supplied to a shift register SR1 and the 1H delay circuit 1HDL1p that applies a time delay of 1 horizontal scan cycle (1H) to the signals. The signals output from the 1H delay circuit 1HDL1p are supplied to the shift register SR2p and the 1H delay circuit 1HDL2p, and the signals output from the 1HD2p are supplied to the shift register SR3p and the 1H delay circuit 1HDL3p, and the signals output from the 1H delay circuit 1HDL3p are supplied to the shift register SR4p and the 1H delay circuit 1HDL4p, and the signals output from the 1H delay circuit 1HDL4p are supplied to the shift register SR5p. These five shift registers SR1p through SR5p simultaneously input the digital brightness signals of the picture element portion (the picture element portion that is lined in the vertical direction on the screen) and which corresponds to the five horizontal scan cycles following on the time axis.

These five shift registers SR1p through SR5p are of the type that has serial input and parallel output and digital brightness signals corresponding to 25 picture elements are simultaneously output from the total of 25 storage divisions of the five shift registers SR1p through SR5p. Inside the 25 storage divisions of the five shift registers SR1p through SR5p shown in FIG. 2, digital brightness signals corresponding to 13 picture elements output at the same time from 13 storage divisions and excepting those shown by the diagonal hatching in the figure are respectively supplied to each of the comparators CX1 through CX6, CN1 through CN6 shown in FIG. 2 and in the supply status shown in FIG. 2, and the comparison results of the two respectively supplied inputs are respectively output.

In the configuration example of the peak point detection circuit 3 shown in FIG. 3, the digital brightness signals corresponding to the 13 picture elements that are output at the same time from the 13 storage divisions in the five shift registers SR1p through SR5p correspond to the information of the brightness value of the picture element a that is the object of investigation, and information for the brightness of m number of picture elements around the periphery of the picture element a, and the digital brightness signals that are output from the storage division in the center portion of the shift register SR3p in FIG. 2 correspond to information for the brightness value of the picture element a that is the object of investigation, and with the exception of the digital brightness signals that are output from the storage division in the center portion of the shift register SR3p, the 12 digital signals respectively correspond to information for the brightness value of m number of picture elements on the periphery of the picture element a.

Then, the comparison output from the comparators CX1 through CX6 is output as the result of comparison operation performed by the comparators CX7 through CX12 provided in a stacked structure status and including the comparators CX1 through CX6, from the comparator CX12 which is the final stage in the comparator group CX1 through CX12 provided in the stacked structure status, as the peak value for the brightness value of the maximum value for those brightness values of digital brightness signals corresponding to the 13 picture elements supplied to the comparator group CX1 through CX12. Also, the comparison output from the comparators CX1 through CX6 is output as the result of comparison operation performed by the comparators CX7 thorugh CX 12 provided in a stacked structure status and including the comparators CX1 through CX6, from the comparator CX12 which is the final stage in the comparator group CX1 through CX12 provided in the stacked structure status, as the peak value for the brightness value of the minimum value for those brightness values of digital brightness signals corresponding to the 13 picture elements supplied to the comparator group CX1 through CX12.

Then, the information of the brightness value which has been output from the comparator CX12 which is the final stage in the comparator group CX1 through CX12 digital brightness signals output from the storage division in the center portion in the shift register SR3p of FIG. 2, that is the information for the brightness value of the picture element a that is the object of investigation is compared by the comparator Ex, and the information of the brightness value which has been output from the comparator CX12 which is the final stage in the comparator group CX1 through CX12 digital brightness signals output from the storage division in the center portion in the shift register SR3p of FIG. 2, that is the information for the brightness value of the picture element a that is the object of investigation is compared by the comparator En. The configuration is such that there is output of the logical value "1" only when the two inputs to the comparators Ex and En are equal.

Then, the output signal Eq that is output from the OR circuit which inputs the output signals of the comparators Ex and En, outputs the logical value "1" only when the digital brightness signal output from the storage division of the center portion in the shift register SR3p is a positive peak value or a negative peak value. Moreover, the address value of the digital brightness signal output from the storage division of the center portion in the shift register SR3p can be known by verifying the instantaneous address of the time-serialized digital brightness signal supplied to the input terminal 3a, and the peak brightness value can be known by the digital brightness signal output from the storage division of the center portion in the shift register SR3p, that is, the information of the brightness value of the picture element that is the object of investigation.

In this manner, in the peak point detection circuit 3 shown in FIG. 2, it is possible to extract the positive and negative peak values, and that picture element address in the required area (the five line and five column diamond shape in the example shown in FIG. 2) of the time-serialized digital brightness signal string of the picture element and which has been supplied to the input terminal 3a.

FIG. 3 is a block diagram showing an example of the configuration of a sudden-change detection circuit 4 in the system shown in FIG. 1, and the sudden-change point detection circuit 4 shown in this FIG. 3 is a sudden-change point detection circuit 4 configured so that when a plural number of surfaces with a substantially constant brightness gradient are in contact, it extracts the characteristic point of that point of contact. The brightness gradient is generally expressed as a primary integral but the inclination of pairs of brightness gradients is expressed by measuring the two dimensional integral values. Then, if the data of the image that is the object of sudden-change detection is a two-dimensional brightness function, the brightness inclination is determined by calculation of the two-dimensional second degree integral (Laplacian). Then, when the calculation of the Laplacian is performed by a separate system, if the calculation object picture element address is ij, and if the brightness value of the calculation object picture element is Bij, the Laplacian calculation can be determine by subtracting 8Bij from the sum of the brightness values of the 8 picture elements of the periphery of the calculation object address ij.

4a in FIG. 3 is an input terminal and in the same manner as the case for the peak point detection circuit 3 described with reference to FIG. 2, and the image that is the object of compression of image information is scanned, and the image signals that are generated undergo standard coding by the analog/digital converter 2 and the obtained time-serialized image digital brightness signals (for which the digital brightness signals per one picture element that configures the digital brightness signal string can express, for example 256 gradations with one byte) are input to the input terminal 4a.

These time-serialized image digital brightness signals that are input to the input terminal 4a are supplied to a shift register SR1 and the 1H delay circuit 1HDL1 that applies a time delay of 1 horizontal scan cycle (1H) to the signals. The signals output from the 1H delay circuit 1HDL1 are supplied to the shift register SR2 and the 1H delay circuit 1HDL2, and the signals output from the 1HD2 are supplied to the shift register SR3 and the 1H. delay circuit 1HDL3, and the signals output from the 1H delay circuit 1HDL3 are supplied to the shift register SR4 and the 1H delay circuit 1HDL4, and the signals output from the 1H delay circuit 1HDL4 are supplied to the shift register SR5. These five shift registers SR1 through SR5 simultaneously input the digital brightness signals of the picture element portion (the picture element portion that is lined in the vertical direction on the screen) and which corresponds to the five horizontal scan cycles following on the time axis.

These five shift registers SR1p through SR5p are of the type that has serial input and parallel output and digital brightness signals corresponding to 25 picture elements are simultaneously output from the total of 25 storage divisions of the five shift registers SR1 through SR5. Inside the 25 storage divisions of the five shift registers SR1 through SR5 shown in FIG. 3, of the digital brightness signals corresponding to 9 picture elements output at the same time from 9 storage divisions and excepting those shown by the diagonal hatching in the figure, the digital brightness signals (digital brightness signals of the center picture element are the digital brightness signals of a picture element that is the object of calculation) that are output from the storage division at the central portion in the shift register SR3 are sent to the output terminal 4b as the information zs of the brightness value, and with the exception of those shown by the diagonal hatching in the figure, of those digital brightness signals corresponding to the 9 picture elements that are output at the same time from the 9 storage divisions, the 8 digital brightness signals other than the digital brightness signals that are output from the storage division at the central portion in the shift register SR3 (digital brightness signals of the center picture element are the digital brightness signals of a picture element that is the object of calculation) are supplied to the adder 13.

Then, the calculation results of the brightness gradient of the two-dimensional brightness function for the image that is the object of sudden-change detection, that is, when the calculation object picture element address is ij and the calculation object picture element brightness value is Bij, then the calculation results for the Laplacian value determined by subtracting 8Bij from the sum of the brightness values for the 8 picture elements on the periphery of the calculation object picture element address ij can be obtained on the output side of the adder 13.

Moreover, in the example configuration shown in FIG. 3, there is not a density status for the calculation object picture element and the peripheral picture elements but this is because the configuration considers the prevention of erroneous detection due to noise by narrowing the detection bandwidth.

The output from the adder 13 is information for sudden change of brightness, but there is both a sudden increase of brightness and a sudden decrease of brightness for the status of sudden change of brightness and thus there is both positive and negative output in the output from the adder 13. It is necessary to use both the case for a sudden increase of brightness and a sudden decrease of brightness as the characteristic points and so the output signals from the adder 13 have the absolute value taken by the absolute value circuit 15 and supplied to the comparator 16. In the comparator 16, there is comparison with a threshold value supplied to the comparator 16 from the threshold value generation circuit 14, and when the absolute value of the Laplacian is larger than the threshold value, the signal GT indicating the characteristic point is sent with respect to the output terminal 4b. Moreover, the brightness value zs of the calculation object picture element is used as the brightness value of the sudden-change point.

At the time when the scan of one screen (one field cycle in the case where the interlaced scanning system is used) there is the end of extraction operation of the characteristic point with respect to the screen. Then, the information for the characteristic point that is extracted as described above is sent to the coding and transmission circuit 5 as has been described. In the coding and transmission circuit 5, coding such as a conversion to a known code such as a Huffman code is performed so that the information can be efficiently transferred, and there is transfer to the receive decoding circuit 7 via the transmission circuit 6. The execution of extraction operation of the characteristic point for the next screen in the peak point detection circuit 3 and the sudden-change point detection circuit 4 is performed during the time that it is necessary to transfer and the coding time that is required for the coding by for example, Huffman codes. Moreover, because the number of detections of characteristic points is large, when the coding time and the transfer time exceeds the scan cycle for one screen because the number of detections of characteristic points is large, the threshold value used in the detection operation for the sudden-change points can be adjusted so that the number of characteristic points detected is controlled.

In the receive decoding circuit 7, the coded signals that have been transferred to it are decoded and applied to the brightness function reproduction apparatus 8. In the brightness function reproduction apparatus 8, the supplied information for the characteristic points is used to regenerate the two-dimensional brightness function prior to compression. When the brightness value and the address of the characteristic points with respect to the brightness function reproduction apparatus 8 shown in FIG. 5 is supplied as the input information, the address information of the characteristic points in the input information is used to select the connection point that corresponds to the address of the characteristic point in the characteristic points of the resistors R, R, . . . of the resistor mesh, and the information for the brightness value of the resistor R, R, . . . in the resistor mesh selected by the address of the characteristic point is supplied.

The following is a more specific description of the decompression operation for the image information and that occurs in the brightness function reproduction apparatus 8, with reference to FIG. 6. In the brightness function reproduction apparatus 8, the picture element corresponding to the corner (of the four corners of the object image) in the resistor mesh is automatically seen as a characteristic point and so the voltage value of the connection point P1 shown with a double black circle in FIG. 6 is determined. In addition, since it not possible to have two-dimensional characteristic judgment for the picture element array on the side of the image, one-dimensional characteristic judgment is performed for the sides and the results are determined as P2, and P3 which is the linear interpolation of these is also registered as a characteristic point and so the determine voltages are supplied to P1, P2 and P3 for the screen periphery. Next, the peak points and the sudden-change point in the inside of the screen are supplied and the remaining P5 is an untransmitted picture element but the brightness value of P5 is reproduced by measuring the interpolation voltage by a voltage detection apparatus.

Moreover, all of the connection points of the resistors R, R, . . . in the resistor mesh used in the brightness function reproduction apparatus 8 correspond to all of the picture elements of the object image but in the embodiment, the configuration of the brightness function reproduction apparatus 8 can be such that a resistor mesh provided with connection points corresponding to picture elements of a region of one portion of the object image can be used instead.

The reproduced voltage and the determined voltage corresponding to the respectively required brightness values supplied with respect to all of the characteristic points of a plural number of places in one screen are generated at the same time by the analog values on the resistor mesh and so the switches SW that are respectively and separately connected to the connection points of each resistor R, R, . . . in the resistor mesh are turned on one at a time in a required order so that the voltage at the connection points of each of the resistors R, R, in the resistor mesh are taken directly as the output. As has already been described, the necessary signals such as sync signals and the like are added to the output signals forming the time-serialized signals.

Even in cases where an image information compression system and an image information decompression system have synchronous operation in realtime, the nature of the two systems is such that they have independent operation but the present invention can also be implemented so that there is synchronous operation for the two systems. The foregoing description has the case when the brightness function is two dimensional but the multi-dimensional image compression & decompression system of the present invention can also be implemented in the same manner for a three-dimensional multi-dimensional image compression & decompression system that detects the characteristic points across a plural number of frames.

In addition, the multi-dimensional image compression & decompression system of the present invention can of course to be applied to a system that has a plural number of signals such as a color equation using brightness signals and color difference signals, or colors using the three primary colors of red, green and blue, and in this case, the addresses of the characteristic points in each of the signals is shared by a plural number of elements, and it is possible to set the detection sensitivity so that is different for the characteristic points of brightness information and the color difference information.

What is claimed is:

1. A multi-dimensional image compression and decompression method comprising:
   a step of extracting as characteristic points of image information a local brightness maximum point, a local brightness minimum point, and a brightness sudden-change point in multi-valve image information as digital data which is converted form three-dimensional image information, and which includes two-dimensional multi-value brightness information and a time axis in a still image,
   a step of transferring as compressed image information a value for a position and a brightness characteristic point of said image information; and
   a step of determining a position and a brightness corresponding to an image that is to have said characteristic points regenerated for said compressed image information, and decompressing by reference to complex interpolation lines inside a multi-dimensional space so that a distance from said characteristic point is proportional and does not influence peripheral picture elements.

2. The multi-dimensional image compression and decompression method of claim 1, wherein
   said characteristic points extracted in the extraction step and regenerated in the decompression step are each corner point in said still image.

3. The multi-dimensional image compression and decompression method of claim 2, wherein
   said image information is three primary color multi-value brightness information.

4. The multi-dimensional image compression and decompression method of claim 3, wherein
a position of said characteristic points in three color multi-value brightness information uses shared primary colors.

5. The multi-dimensional image compression and decompression method of claim 2, wherein
said image information is multi-value brightness information and multi-value color difference signal information.

6. The multi-dimensional image compression and decompression method of claim 5, wherein
positions of said characteristics points of said multi-value brightness information and said multi-value color difference signal information are used in common.

7. The multi-dimensional image compression and decompression method of claim 5, wherein
said multi-value brightness information and said multi-value color difference signal information have different sensitivities for their characteristic points.

8. The multi-dimensional image compression and decompression method of claim 1, wherein
said characteristic points extracted in the extraction step and regenerated in the decompression step are detected by using one-dimensional multi-value brightness information on an edge of said still image.

9. The multi-dimensional image compression and decompression method of claim 1, wherein
said characteristic points extracted in the extraction step and regenerated in the decompression step are detected by using two-dimensional multi-value brightness information on an edge of said still image.

10. A multi-dimensional image compression and decompression system comprising
extraction means for extracting characteristic points of multi-value image information including a local brightness maximum point, a local brightness minimum point, and a brightness sudden-change point in multi-value image information as digital data which is converted from three-dimensional multi-value image information that includes two-dimensional brightness information and a time axis in a plurality of still images;
means for coding only multi-value image information relating to characteristic points extracted by said extraction means so as to compress said multi-value image information and generating coded signals representative thereof;
decoding means for receiving said coded signals and decoding said coded signals; and
decompression means receiving output of said decoding means for using multi-value image information relating to characteristic points which have been decoded to regenerate said multi-value image information prior to compression.

11. The multi-dimensional image compression and decompression method of claim 10, wherein
said extraction means comprises a peak point detection circuit which detects peak points of a brightness of said multi-value image information signals which have undergone analog/digital conversion, and a sudden-change point detection circuit which detects sudden-change points of brightness of said multi-value image information signals.

12. The multi-dimensional image compression and decompression method of claim 11, wherein
said coding means comprises a coding and transfer circuit which codes said multi-value image information signals on the basis of detection values of said peak point detection circuit and said sudden-change point detection circuit and transfers said multi-value coded image information signals.

13. The multi-dimensional image compression and decompression method of claim 12, wherein
said decoding means comprises a receiving and decoding circuit which receives coded multi-value image information supplied by the transfer circuit and decodes said multi-value coded image information signals.

14. The multi-dimensional image compression and decompression method of claim 10, wherein
said decompression means includes a function reproduction apparatus which performs proximity calculation or calculation using the following equation $$Za = \Sigma(Zi/ri)/\Sigma(1/ri)$$

where,
Za is the decompressed brightness value,
zi is the brightness value of each characteristic points,
ri is the distance element from each characteristic point to the restoration point, and
i is a characteristic point number.

15. The multi-dimensional image compression and decompression method of claim 14, wherein
said function reproduction apparatus includes a calculation apparatus comprising a resistor mesh.

* * * * *